US008847585B2

United States Patent
Koto et al.

(10) Patent No.: US 8,847,585 B2
(45) Date of Patent: Sep. 30, 2014

(54) MAGNETIC ABSOLUTE ENCODER AND MOTOR

(75) Inventors: Tsukasa Koto, Azumino (JP); Toshiki Maruyama, Azumino (JP); Yuki Kato, Azumino (JP); Kunio Miyashita, Azumino (JP)

(73) Assignee: Harmonic Drive Systems Inc., Shinagawa-Ku, Tokyo (JP)

( * ) Notice: Subject to any disclaimer, the term of this patent is extended or adjusted under 35 U.S.C. 154(b) by 378 days.

(21) Appl. No.: 13/510,053

(22) PCT Filed: Nov. 18, 2009

(86) PCT No.: PCT/JP2009/006192
§ 371 (c)(1),
(2), (4) Date: May 16, 2012

(87) PCT Pub. No.: WO2011/061794
PCT Pub. Date: May 26, 2011

(65) Prior Publication Data
US 2012/0229127 A1    Sep. 13, 2012

(51) Int. Cl.
*G01B 7/30*       (2006.01)
*G01D 5/245*     (2006.01)
*G01D 5/14*       (2006.01)

(52) U.S. Cl.
CPC .............. *G01D 5/2452* (2013.01); *G01D 5/145* (2013.01)
USPC .................................. 324/207.25; 324/207.2

(58) Field of Classification Search
USPC ............. 324/207.2, 207.21, 207.25, 173–174
See application file for complete search history.

(56) References Cited

U.S. PATENT DOCUMENTS

| 5,430,373 A * | 7/1995 | Ichikawa et al. .......... 324/207.21 |
| 6,243,023 B1 * | 6/2001 | Katagiri ................... 340/870.03 |
| 2009/0315544 A1 * | 12/2009 | Takahashi et al. ........ 324/207.25 |
| 2011/0187355 A1 * | 8/2011 | Dixon et al. ............. 324/207.25 |

FOREIGN PATENT DOCUMENTS

| JP | 6-10813 U | 2/1994 |
| JP | 6-34390 A | 2/1994 |
| JP | 2007-115794 A | 5/2007 |
| WO | WO 2008/136053 A1 | 11/2008 |

OTHER PUBLICATIONS

International Search Report (PCT/ISA/210) issued on Feb. 9, 2010, by the Japanese Patent Office as the International Searching Authority for International Application No. PCT/JP2009/006192.

\* cited by examiner

*Primary Examiner* — Jay Patidar
(74) *Attorney, Agent, or Firm* — Buchanan Ingersoll & Rooney PC

(57) ABSTRACT

A magnetic absolute encoder includes: a board-holding assembly mounted to a motor case assembly side; and a flexible printed wiring board which is held, by the board-holding assembly, in the shape of a loop surrounding multi-polar and bipolar ring magnets. On the flexible printed wiring board, multipolar-side hall elements and bipolar-side hall elements are mounted and a wiring pattern relating to the hall elements are printed. The assembling work and wiring work of the magnetic absolute encoder provided with a multipolar magnetic encoder and a bipolar magnetic encoder can be performed simply in a short time.

7 Claims, 6 Drawing Sheets

(a)

(b)

US 8,847,585 B2

MAGNETIC ABSOLUTE ENCODER AND MOTOR

TECHNICAL FIELD

The present invention relates to a magnetic absolute encoder for detecting the absolute position of a rotary shaft within a single revolution using two sets of magnetic encoders, and to a motor provided with the magnetic absolute encoder; and more specifically relates to a magnetic absolute encoder that is made to allow the work of assembling the two sets of magnetic encoders and the work of positioning a magnetic detection element to be performed in a simple manner, and to a motor provided with the magnetic absolute encoder.

BACKGROUND ART

There are known magnetic absolute encoders that use two sets of magnetic encoders to detect with good precision the absolute position of a rotary shaft. A magnetic absolute encoder that uses a bipolar magnetic encoder and a 64-pole magnetic encoder is proposed in Patent Document 1. A magnetic absolute encoder is proposed in Patent Document 2 in which the absolute position can be detected with high precision using a bipolar magnetic encoder and a multipolar magnetic encoder without being affected by the resolution and precision of the bipolar magnetic encoder.

PRIOR ART DOCUMENTS

Patent Documents

Patent Document 1: Japanese Laid-open Utility Model Application Publication No. 06-10813
Patent Document 2: International Patent Application Gazette WO2008/136053

DISCLOSURE OF THE INVENTION

Problems to be Solved by the Invention

Each pair of magnetic encoders in such a magnetic absolute encoder is provided with a magnet attached to a rotary shaft and a pair of magnetic detection elements (e.g., Hall elements) arranged opposite the magnet. Each magnetic detection element is mounted on a printed-wiring board, and a plurality of lead wires drawn out of each printed-wiring board is connected to a computing circuit for processing signals. In each set of magnetic encoders, a relative position between magnetic detection elements and a mounting position for each magnetic detection element relative to the magnets must be established so as to generate A-phase and B-phase sinusoidal analog signals having predetermined amplitudes that differ in phase by 90 degrees from the pair of magnetic detection elements in accompaniment with the rotation of the magnets. A wire-connection work is further needed to connect, without error, the plurality of lead wires drawn out of each printed-wiring board on which the magnetic detection elements are mounted to each terminal on the computing circuit side.

Such positioning work and wire-connecting work are time consuming when two sets of magnetic encoders are provided. Wiring errors and disconnects are also readily occur because there is a need to draw a plurality of lead wires around in a small space. The positioning work and wire-connecting work are extremely time consuming in the particular case that a plurality of pairs of magnetic detection elements are arranged in order to increase detection precision in each set of magnetic encoders. There is also a problem in which time is required to determine connection error locations, disconnect locations, and other fault locations when connection errors and disconnects occur.

In view of the preceding points, an object of the present invention is to propose a magnetic absolute encoder wherein the assembly work and the work of positioning the magnetic detection elements can be performed in a simple manner and in a small amount of time.

Means to Solve the Problems

In order to solve the above-mentioned problems, the magnetic absolute encoder of the present invention is characterized in comprising:
  a bipolar magnet in which a circular external peripheral surface is a bipolar magnetized surface;
  a bipolar-side first magnetic detection element and a bipolar-side second magnetic detection element for obtaining detection signals that differ 90 degrees in phase in accompaniment with the rotation of the bipolar magnet;
  a multipolar magnet in which a circular external peripheral surface has a multipolar magnetized surface of four or more poles, the multipolar magnet being adjacently arranged in a coaxial state in relation to the bipolar magnet;
  a multipolar-side first magnetic detection element and a multipolar-side second magnetic detection element that are used for obtaining detection signals that differ 90 degrees in phase in accompaniment with the rotation of the multipolar magnet;
  a flexible printed-wiring board on which the bipolar-side first magnetic detection element, the bipolar-side second magnetic detection element, the multipolar-side first magnetic detection element, and the multipolar-side second magnetic detection element are mounted; and
  an annular board-holding part arranged in a coaxial state in relation to the bipolar magnet, wherein
  the board-holding part holds the flexible printed-wiring board in a loop shape surrounding the bipolar magnet and the multipolar magnet, and
  the bipolar-side first magnetic detection element and the bipolar-side second magnetic detection element face the bipolar magnetized surface of the bipolar magnet at a fixed interval, and the multipolar-side first magnetic detection element and the multipolar-side second magnetic detection element face the multipolar magnetized surface of the multipolar magnet at a fixed interval.

The present invention uses a single flexible printed-wiring board on which all magnetic detection elements are mounted instead of using magnetic detection elements that are each mounted on independent printed-wiring boards. In other words, in addition to mounting all magnetic detection elements on a single flexible printed-wiring board, wiring patterns to be drawn out from each magnetic detection element are printed thereon and the flexible printed-wiring board is retained in a loop shape so as to surround the bipolar magnet and the multipolar magnet. The work of connecting and drawing out lead wires to the printed-wiring board for each magnetic detection element becomes unnecessary because the flexible printed-wiring board merely needs to be attached to a board-holding part so each magnetic detection element is in a predetermined position.

A possible configuration is one in which the board-holding part is provided with an annular base plate, and first and second board-mounting bases that are arranged at predetermined angular intervals so as to be positioned on the same circle on an annular end surface of the base plate; and the first and second board-mounting bases are provided with first and second board-mounting surfaces, respectively, that face the center of the same circle and that are perpendicular to the annular end surface. In this case, the reverse-side portion of the flexible printed-wiring board can be secured to each of the first and second board-mounting surfaces. The surface of a portion that is secured to the first board-mounting surface of the flexible printed-wiring board can be made to be a mounting portion to which the bipolar-side first magnetic detection element and the multipolar-side magnetic detection element are mounted, and the surface of the portion secured to the second board-mounting surface of the flexible printed-wiring board can be made to be a mounting portion to which the bipolar-side second magnetic detection element and the multipolar-side magnetic detection element are mounted.

The work of positioning the magnetic detection element is made simple because each magnetic detection element is positioned by securing the mounting portion of the flexible printed-wiring board to the first and second board-mounting bases.

In this case, the first and second board-mounting bases are preferably attached to the annular end surface by screws or the like so as to allow movement for a predetermined distance in the circumferential direction. By doing so, the position of the base mounting board in the circumferential direction can be adjusted based on the detection signal of each magnetic detection element after the mounting portion of the magnetic detection element of the flexible printed-wiring board has been temporarily affixed to each base mounting board, and the base mounting board can be secured to the baseboard by an adhesive or the like in a position where an appropriate detection signal can be obtained. The work of adjusting the attaching position of each magnetic detection element is thereby made simple. Also, in this case, it is desirable for the flexible print-wiring board to span each base mounting board in a slack state. The position of the magnetic detection element can be adjusted in a simple manner without damaging the flexible printed-wiring board because unnecessary force is not applied to the flexible printed-wiring board when the attachment position of the magnetic detection element is adjusted.

A plurality of pairs of magnetic detection elements are preferably arranged in relation to the bipolar magnet and the multipolar magnet in order to remove the noise component that is included in the detection signal of the magnetic detection element. When two pairs of magnetic detection elements are arranged, a bipolar-side third magnetic detection element used for obtaining a detection signal that is in phase or reverse phase with the bipolar-side first magnetic detection element and a bipolar-side fourth magnetic detection element for obtaining a detection signal that is in phase or reverse phase with the bipolar-side second magnetic detection element in accompaniment with the rotation of the bipolar magnet are arranged. Similarly, a multipolar-side third magnetic detection element for obtaining a detection signal that is in phase or reverse phase with the multipolar-side first magnetic detection element and a multipolar-side fourth magnetic detection element for obtaining a detection signal that is in phase or reverse phase with the multipolar-side second magnetic detection element in accompaniment with the rotation of the multipolar magnet are arranged.

In this case, a third board-mounting base and a fourth board-mounting base can be provided to the board-holding part in addition to the first and second board-mounting bases, the first, second, third, and fourth board-mounting bases can be attached at 90 degree angular intervals so as to be positioned on the same circle, and third and fourth board-mounting surfaces that are perpendicular to the annular end surface facing the center of the same circle can be formed on the third and fourth board-mounting bases.

In this configuration, a portion of the reverse side of the flexible printed-wiring board is secured to each of the first, second, third, and fourth board-mounting surfaces. The surface of the portion that is secured to the third board-mounting surface of the flexible printed-wiring board is made to be a mounting portion to which the bipolar-side third magnetic detection element and the multipolar-side third magnetic detection element are mounted, and the surface of the portion that is secured to the fourth board-mounting surface of the flexible printed-wiring board is made to be a mounting portion to which the bipolar-side fourth magnetic detection element and the multipolar-side fourth magnetic detection element are mounted.

Next, when an arcuate interface wiring board extending to a predetermined angle range about the center of the baseboard is provided to the outside of the annular end surface of the baseboard, the magnetic absolute encoder of the present invention can have a board draw-out portion for connecting wires that is formed on one edge of the flexible printed-wiring board and that is drawn out from the edge at a predetermined width; and the board draw-out portion can be folded back from the edge, extended to the outside of the radial direction of the baseboard, and connected to the interface wiring board. In this case, the board draw-out portion is preferably a portion with a low out-of-plane rigidity that can be readily folded back in comparison with other portions of the flexible printed-wiring board. A reinforcement layer for preventing a reduction in durability due to the folding back is preferably formed at the base portion of the board draw-out portion.

Next, the present invention relates to a motor having an encoder. The motor of the present invention is characterized in comprising:

a motor rotary shaft;
a motor rotor attached to the motor rotary shaft;
a motor stator arranged in a state surrounding the motor rotor;
an electromagnetic brake for restraining the rotation of the motor rotary shaft, the electromagnetic brake being arranged in a location adjacent the rear side of the motor rotor of the motor rotary shaft; and
a magnetic absolute encoder for detecting a rotational position of the motor rotary shaft, the magnetic absolute encoder being arranged in a location adjacent the rear side of the electromagnetic brake of the motor rotary shaft, wherein
the magnetic absolute encoder having the above-described configuration is used as the magnetic absolute encoder.

The motor rotary shaft is rotatably supported by a cylindrical motor case via a front-side bearing and a rear-side bearing in locations to the front and to the rear of the motor rotary shaft. It is desirable in this case to arrange the rear-side bearing in a location between the electromagnetic brake of the motor rotary shaft and the magnetic absolute encoder, and to use the baseboard of the magnetic absolute encoder as a bearing cap that is in contact from the rear of the center axis line of the motor in relation to the rear-side bearing. In this manner, the dual use of the baseboard as a bearing cap makes it possible to reduce the number of components, and is advantageous for making the motor smaller, more compact, and lower in cost.

Effect of Invention

In the magnetic absolute encoder of the present invention, a plurality of pairs of magnetic detection elements are mounted to a single flexible printed-wiring board and a wiring pattern drawn out from each magnetic detection element is printed on the flexible printed-wiring board. The flexible printed-wiring board is held by a board-holding part in a state in which the flexible printed-wiring board is bent in a loop shape, and each magnetic detection element is positioned in relation to the bipolar magnet and the multipolar magnet. The mounting work and wiring work of the magnetic detection element can be performed in a simple manner in a short amount of time in comparison with individually performing the work of arranging and drawing out lead wires to a plurality of magnetic detection elements and positioning each magnetic detection element.

BEST MODE FOR CARRYING OUT THE INVENTION

A motor that incorporates the magnetic absolute encoder according to a mode of carrying out the present invention is described below with reference to drawings.

(Motor)

Figure 1:
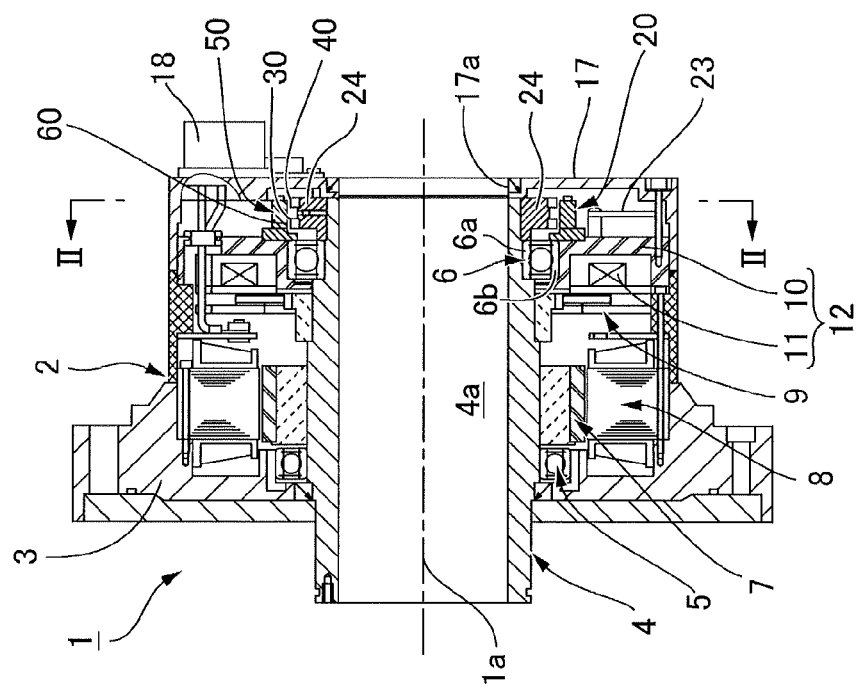
FIGS. 1(a) and (b) are respectively a longitudinal-sectional view showing a motor that incorporates a magnetic absolute encoder to which the present invention has been applied, and an end view showing the rear end surface thereof.
Figure 1:
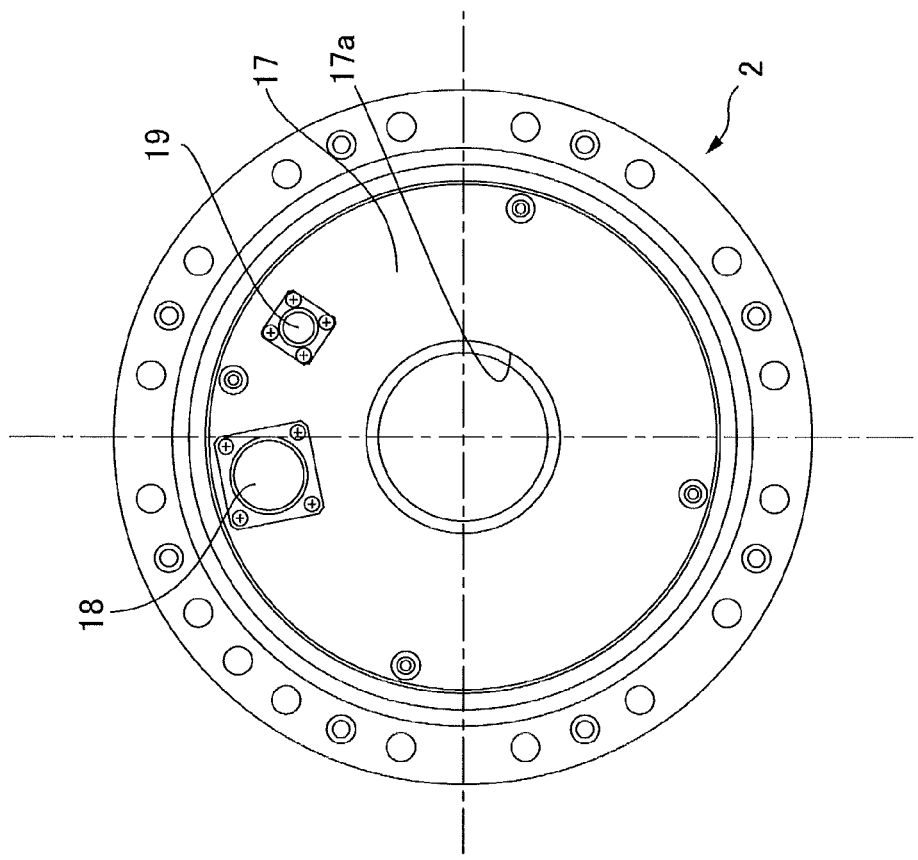
Figure 2:
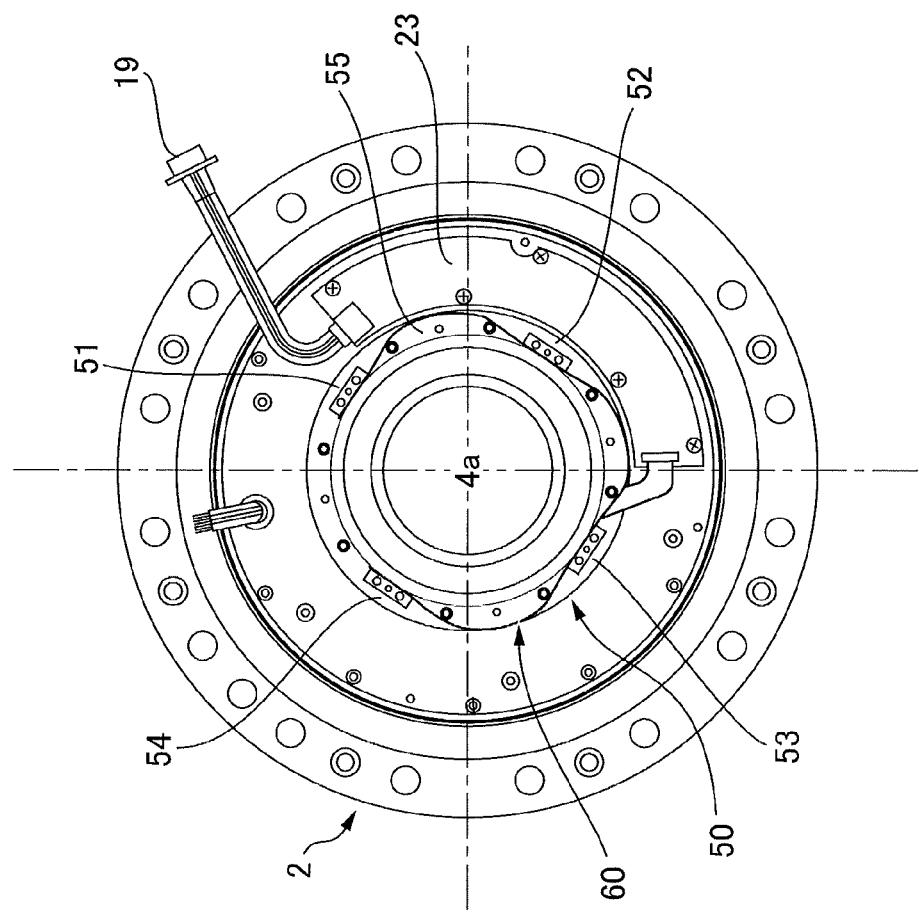
FIG. 2 is a lateral cross-sectional diagram showing a portion bisected by line II-II in FIG. 1(a)

FIGS. 1(a) and (b) are respectively a longitudinal-sectional view showing a motor that incorporates a magnetic absolute encoder to which the present invention has been applied, and an end view showing the rear end surface thereof. FIG. 2 is a lateral cross-sectional diagram showing a portion bisected by line II-II in FIG. 1(a).

The motor 1 comprises a cylindrical motor case assembly 2, and the front end portion of the motor case assembly 2 is a large-diameter mounting flange 3, as shown in FIGS. 1(a), (b). A hollow motor rotary shaft 4 is arranged inside the motor case assembly 2 so as to extend through the center thereof The motor rotary shaft 4 is rotatably supported by the motor case assembly 2 in the locations to the front and rear in the direction of the motor center axis line la of the motor via the front-side bearing 5 and the rear-side bearing 6.

A motor rotor 7 is mounted on the motor rotary shaft 4 in a location adjacent to the rear side of the front-side bearing 5, and a motor stator 8 is mounted on the motor case assembly 2 side of the configuration so as to concentrically surround the motor rotor 7. An electromagnetic brake 9 is arranged in a location on the rear side of the motor rotor 7 of the motor rotary shaft 4.

The electromagnetic brake 9 is, for example, is a non-excitation action type in which braking force is applied to the motor rotary shaft 4 by a spring force (not shown) when the brake is in a non-excited state, and when the brake is in an excited state, the spring force is counteracted by the electromagnetic force and the brake force to the motor rotary shaft 4 is released. The electromagnetic brake 9 comprises an electromagnet 12, and the electromagnet 12 comprises an annular yoke 10 secured to the motor case assembly 2, and an electromagnet coil 11 arranged inside the annular yoke. The rear-side bearing 6 is concentrically affixed to the internal peripheral surface of the yoke 10, and the rear-side portion of the motor rotary shaft 4 is rotatably supported by the rear-side bearing 6.

The magnetic absolute encoder 20 is arranged in a location adjacent to the rear of the yoke 10 of the motor rotary shaft 4. The rear end of the motor case assembly 2 is sealed by a disk-shaped encoder cover 17. A center aperture 17a that is in communication with the hollow part 4a of the motor rotary shaft 4 is formed on the encoder cover 17. A motor connector 18 and an encoder connector 19 are mounted adjacently along the circumferential direction in a location of the external peripheral side of the encoder cover 17.

(Magnetic Absolute Encoder)

Figure 3:
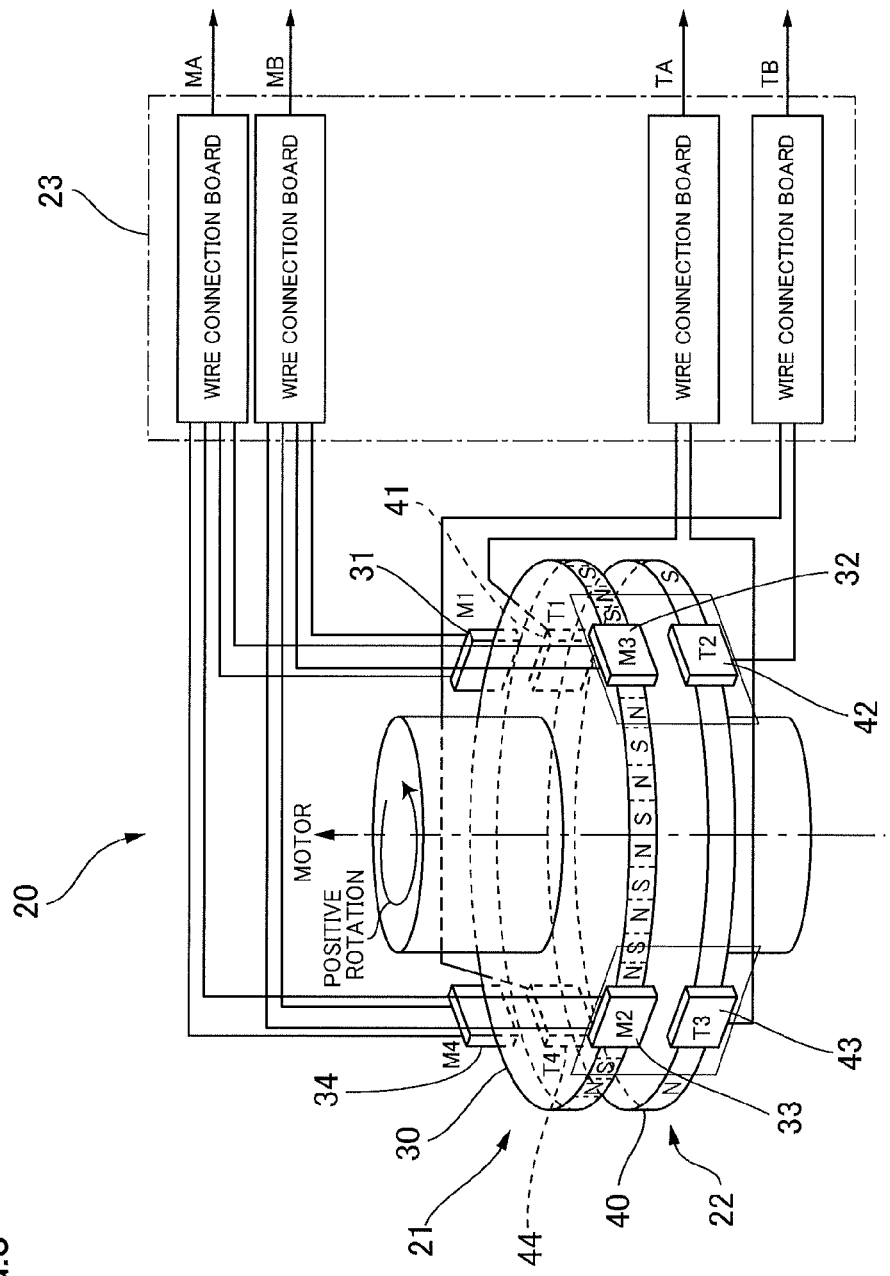
FIG. 3 is a schematic diagram of a mechanical portion of the magnetic absolute encoder.

FIG. 3 is a schematic diagram of a mechanical portion of the magnetic absolute encoder 20. The magnetic absolute encoder 20 is composed of two sets of magnetic encoders, and one is a multipolar magnetic encoder 21 and the other is a bipolar magnetic encoder 22. The multipolar magnetic encoder 21 comprises a multipolar ring magnet 30 and a plurality of magnetic detection elements which, in the present example, are four Hall elements 31 to 34. The multipolar ring magnet 30 is multipolarly magnetized on the circular external peripheral surface thereof, and has two or more pairs of magnetic poles formed thereon in equiangular intervals along the external peripheral surface. The arranged positions of the Hall elements are set so that an A-phase detection signal is obtained from the Hall elements 31 (M1) and 33 (M2), and a B-phase detection signal that differs in phase from the A-phase by 90 degrees is obtained from the Hall elements 32 (M3), 34 (M4); and the arranged angular interval is about 90 degrees in the present example.

The bipolar magnetic encoder 22 comprises a bipolar ring magnet 40 and a plurality of magnetic detection elements which, in the present example, are four Hall elements 41 to 44. The bipolar ring magnet 40 is bipolarly magnetized on the circular external peripheral surface thereof, and has a pair of magnetic poles formed thereon. The Hall elements 41 to 44 are arranged in 90 degree angular intervals along the circular external peripheral surface of the bipolar ring magnet 40, and A-phase and opposite phase detection signals are obtained from the Hall elements 41 (T1), 43 (T3), and B-phase and opposite phase detection signals are obtained from the Hall elements 42 (T2), 44 (T4).

The detection signals from each Hall element 31 to 34, 41 to 44 are combined via a connecting part that is mounted on an IF wiring board 23; multipolar-side A-phase signal MA, multipolar-side B-phase signal MB, bipolar-side A-phase signal TA, and bipolar-side B-phase signal TB are generated; the signals are fed to an arithmetic circuit (not shown) for processing signals; and the absolute rotational position of the motor rotary shaft 4 within a single rotation and the number of rotations of the motor rotary shaft 4 from the original position are calculated by the arithmetic circuit.

The mechanical part of the magnetic absolute encoder 20 of this arrangement will be described in detail. First, as shown in FIG. 1, the mechanical part of the magnetic absolute encoder 20 comprises an annular boss 24 that is concentrically secured to the external peripheral surface of the rear-end portion of the motor rotary shaft 4, and the multipolar ring magnet 30 and the bipolar ring magnet 40 are coaxially secured to the circular external peripheral surface of the boss 24 in adjacent positions.

The board-holding assembly 50 is arranged in a state surrounding these magnets 30, 40. A flexible printed-wiring board 60 of a constant width is held by the board-holding assembly 50 in a bent, loop-shaped state surrounding the multipolar ring magnet 30 and the bipolar ring magnet 40. The multipolar-side Hall elements 31 to 34 and the bipolar-side Hall elements 41 to 44 are mounted on the flexible printed-wiring board 60. A wiring pattern drawn out from each Hall element is also printed thereon. An arcuate IF wiring board 23 of constant width stretched at a predetermined angle is arranged to the outside of the board-holding assembly 50, as is apparent from FIGS. 1, 2.

(Board-Holding Assembly)

FIG. 4(a) is a frontal view showing the board-holding assembly 50 (board-holding part) and the flexible printed-wiring board 60, and FIG. 4(b) is a cross-sectional view of thereof. As shown in the drawings, The board-holding assembly 50 comprises an annular baseboard 55 having a constant width, and four first through fourth board-mounting bases 51 to 54 of the same shape that are secured to an annular end surface 56 on one side of the baseboard 55. The baseboard 55 has a plurality of bolt holes formed along the circumferential direction thereof, and is secured to the yoke 10 by fastening bolts.

The board-mounting bases 51 to 54 are formed from a rectangular metallic plate of a constant thickness, and are mounted vertically to the annular end surface 56 of the baseboard 55 along the circumferential direction thereof at an angular interval of 90 degrees. The inner surfaces of the board-mounting bases 51 to 54 that face center of the baseboard 55 are the board-mounting surfaces 51a-54a, and the flexible printed-wiring assembly 60 that is bent in a loop shape is secured thereto.

The board-mounting bases 51 to 54 can be screwed to respective board-mounting surfaces 51a to 54a so as to allow slight movement in the tangential direction of an inscribed circle 57, and are lastly affixed to the annular end surface 56 with an adhesive.

In the present example, the end surface portion of the internal peripheral rim portion of the baseboard 55 of the board-holding assembly 50 is in contact with the end surface of an outer ring 6a of the rear-side bearing 6, and the baseboard functions as an outer ring cap, as is apparent in FIG. 1. The end surface opposite from the outer ring 6a is in contact with the internal peripheral end surface of the yoke 10. The inner ring 6b of the rear-side bearing 6 is held between the end surface of the boss 24 and a stepped surface formed on the motor rotary shaft 4. In this manner, the dual use of the baseboard 55 and the boss 24 as a bearing cap makes it possible to reduce the number of components, and is advantageous for making the motor smaller, more compact, and lower in cost.

(Flexible Printed-Wiring Board on Which Hall Elements are Mounted)

Figure 5:
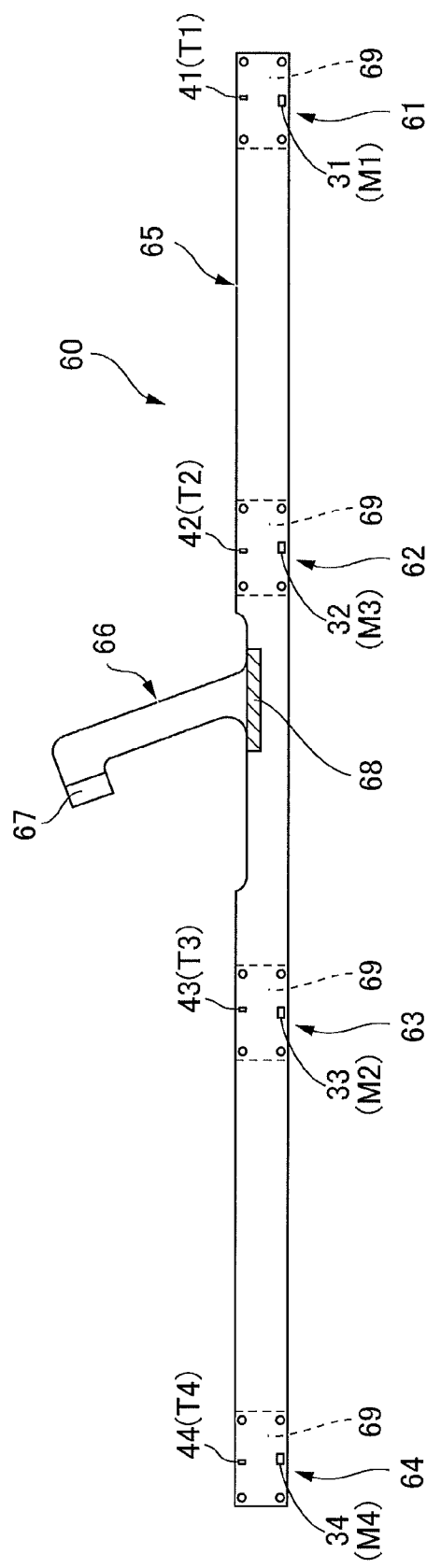
FIG. 5 is a development view showing the flexible printed-wiring board in a state laid out on a flat surface.

Next, FIG. 5 is a development view showing the flexible printed-wiring board 60 in a state laid out on a flat surface, and held by the board-holding assembly 50. In its entirety, the flexible printed-wiring board 60 comprises a thin and long linear main board body portion 65 of a constant width and a drawn-out portion 66 that is drawn out at a constant width in a diagonal direction from an edge portion in an intermediate location in the lengthwise direction of the main board body portion 65. The tip of the drawn-out portion 66 is a terminal part 67 for connecting to the side of the IF wiring board 23. The edge portion of the main board body portion 65 to which the base portion of the drawn-out portion 66 is connected is a reinforcement portion on which a reinforcement layer 68 is formed having a length that includes the base portion at a constant width.

First to fourth element-mounting parts 61 to 64 are formed on the main board body portion 65 at the two ends and in two locations at substantially identical intervals between the two ends, and a rectangular reinforcement board 69 is layered on the reverse surface of the first to fourth element-mounting parts 61 to 64. The reinforcement board 69 defines the adhesion surface to which the board-mounting surfaces 51a to 54a of the board-mounting bases 51 to 54 are secured, and ensures the flatness of the element-mounting parts 61 to 64. A wiring pattern composed of numerous wires is printed on the main board body portion 65 and the drawn-out portion 66.

A multipolar-side Hall element 31 (M1) and a bipolar-side Hall element 41 (T1) are mounted on the first element-mounting part 61 with an interval between in the width direction. A multipolar-side Hall element 32 (M3) and a bipolar-side Hall element 42 (T2) are mounted on the surface of the second element-mounting part 62, a multipolar-side Hall clement 33 (M2) and a bipolar-side Hall element 43 (T3) are mounted on the third element-mounting part 63, and a multipolar-side Hall element 34 (M4) and a bipolar-side Hall element 44 (T4) are mounted on the fourth element-mounting part 64. The first to fourth element-mounting parts 61 to 64 are fixed to the first to fourth board-mounting surfaces 51a to 54a, respectively, of the board-holding assembly 50 by screws and an adhesive.

Figure 6:
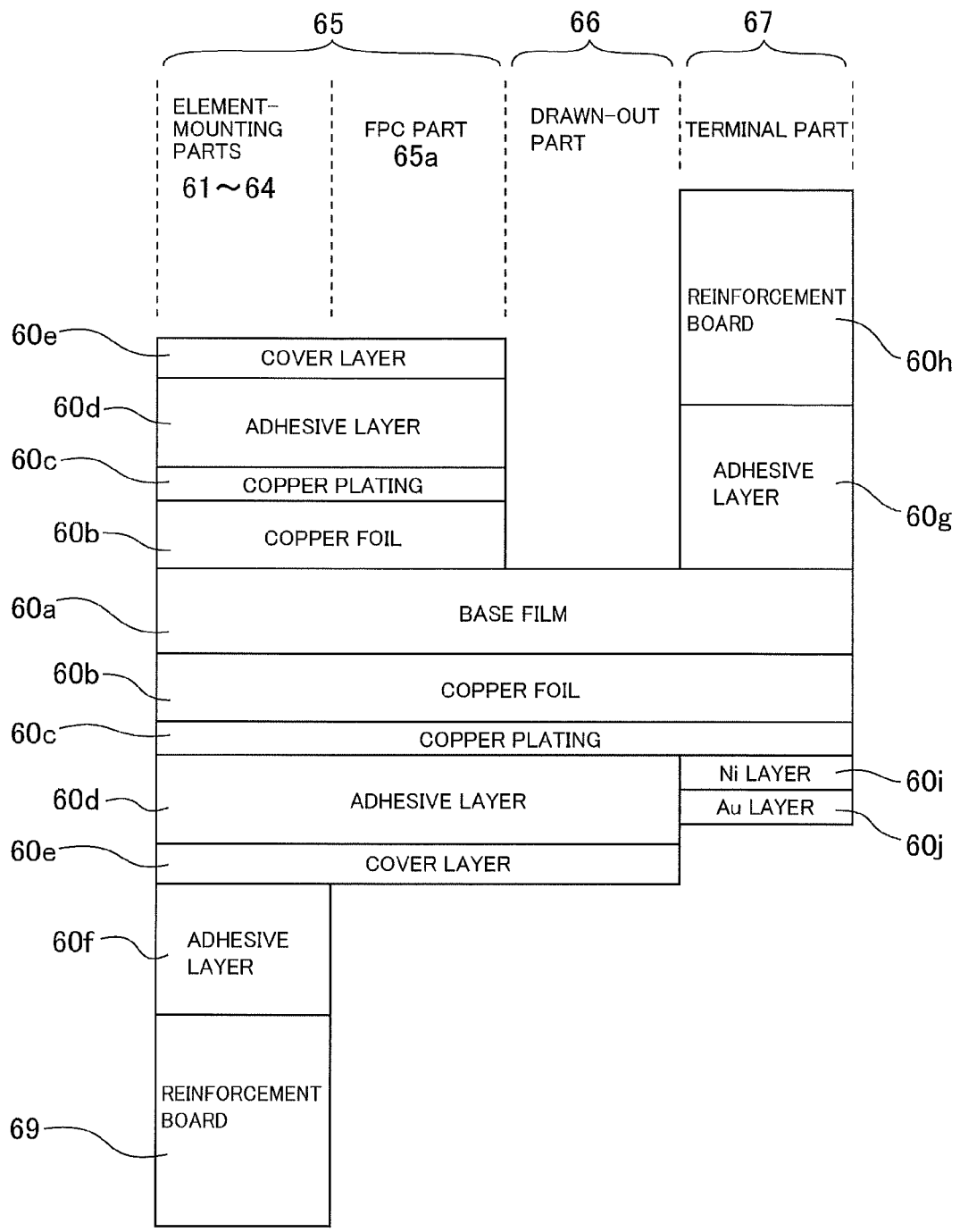
FIG. 6 is an explanatory diagram showing the layered configuration of each portion of the flexible printed-wiring board.

FIG. 6 is an explanatory diagram showing the layered configuration of each portion of the flexible printed-wiring board 60. An FPC part 65a between the element-mounting parts 61 to 64 of the main board body portion 65 is a double-faced printed-type flexible printed-wiring board portion, copper foil 60b is layered on both sides of a base film 60a, a copper plating 60c is layered on the surfaces thereof, and a cover layer 60e is furthermore layered via an adhesive layer 60d. The reinforcement board 69 is attached to the reverse side of the element-mounting parts 61 to 64 via an adhesive layer 60f.

In contrast, the drawn-out portion 66 is made to be a single-sided wiring type structure with a wiring pattern formed on the surface only, and is easily folded back because it is thinner than the main board body portion 65 and has low out-of-plane rigidity. The configuration is such that a reinforcement board 60h is attached to the obverse side of the base film 60a of the terminal part 67 at the tip of the drawn-out portion 66 via an adhesive layer 60g, the copper foil 60b and the copper plating 60c are layered on the reverse side of the base film 60a, and a Ni layer 60i and a Au layer 60j are layered on the surface of the copper plating 60c.

A predetermined reinforcing layer formed on the portion of the reinforcing layer 68 that is formed on the edge portion of the main board body 65 to which the base portion of the drawn-out portion 66 is connected, e.g., in a location on the obverse side of the base film 60a.

Figure 4:
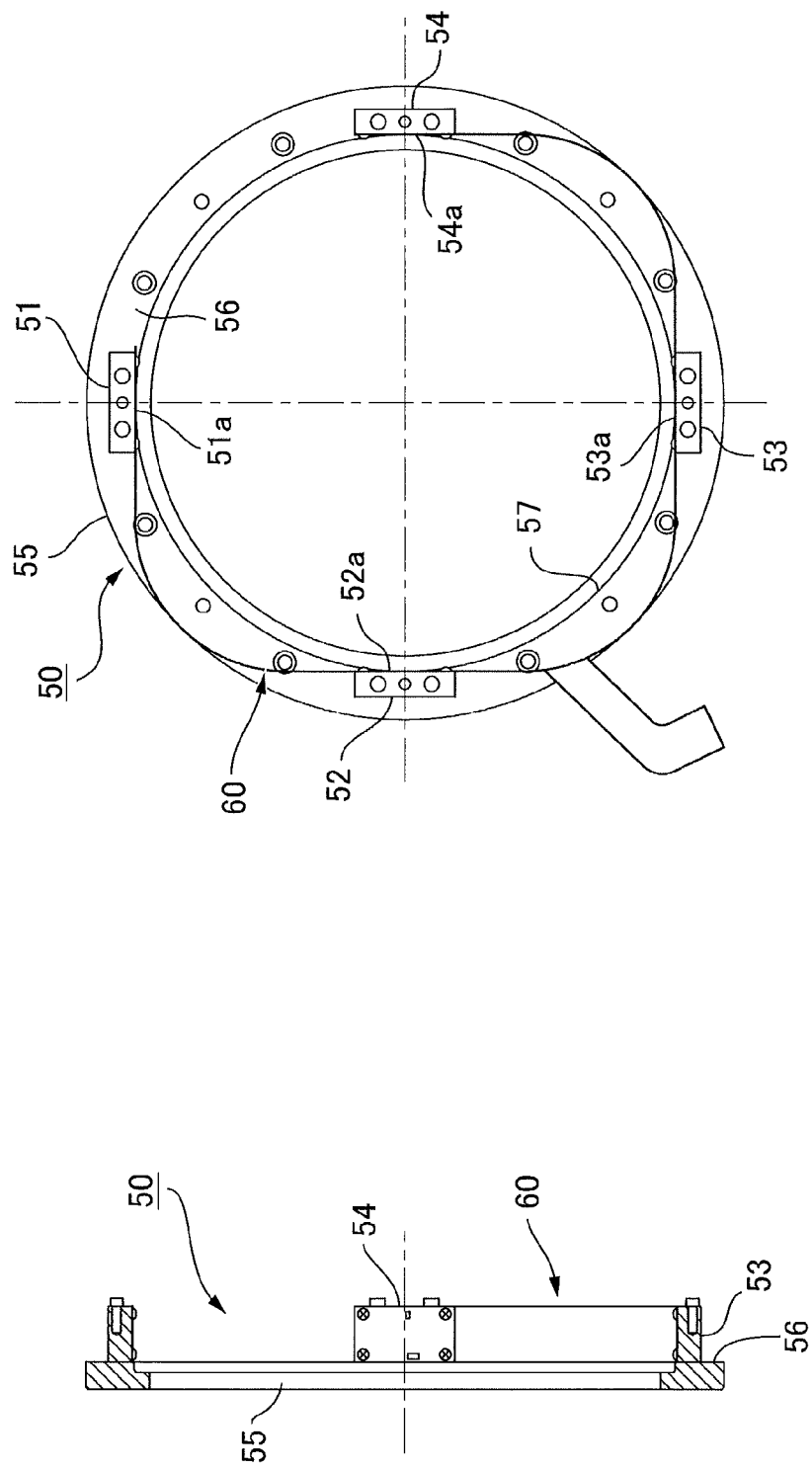
FIG. 4(a) is a frontal view showing the board-holding assembly (board-holding part) and the flexible printed-wiring board, and (b) is a cross-sectional view thereof.

The flexible printed-wiring board 60 of this configuration is bent in a loop shape so that the surface thereof faces inward and is secured to the board-mounting surfaces 51a to 54a, as is apparent in FIG. 4. The portion between the board-mounting surfaces 51a, 52a, the portion between the board-mounting surfaces 52a, 53a, and the portion between the board-mounting surfaces 53a, 54a are spanned in a state that extends outward (in a slack state). The flexible printed-wiring board 60 is arranged to fit in the location within the outer diameter of the baseboard 55 so that the flexible printed-wiring board 60 does not interfere with the portion on the external peripheral side.

In the work of positioning the Hall elements, the flexible printed-wiring board 60 is secured to the board holding assembly 50 and affixed so as to face the multipolar and bipolar ring magnets 30, 40 attached to the motor rotary shaft 4. The drawn-out portion 66 of the flexible printed-wiring board 60 is folded back around the base portion to be substantially perpendicular, and the terminal part 67 on the tip thereof is connected to the connector part of the IF wiring board 23 positioned on the external peripheral side.

The positions of the multipolar-side first to fourth Hall elements 31 to 34 are adjusted in this state on the basis of their detection signals. In other words, each board-mounting base 51 to 54 is moved so that an appropriate detection signal can be obtained.

In the first to fourth element-mounting parts 61 to 64 of the flexible printed-wiring board 60, the multipolar-side Hall elements and the bipolar-side Hall elements are mounted to be in a predetermined positional relationship. Therefore, the positioning of the bipolar-side Hall elements 41 to 44 is performed simultaneously by positioning the multipolar-side Hall elements 31 to 34, so long as the multipolar-side ring magnet 30 and the bipolar-side ring magnet 40 are assembled to the motor rotary shaft 4 with good precision. Therefore, the work of positioning the Hall elements is made simple. After positioning, each board-mounting base is secured to their adjusted positions by an adhesive.

The wiring work of connecting a plurality of lead wires to the printed-wiring board on which each Hall element is mounted, and drawing out these lead wires to the IF wiring board 23 is unnecessary because wiring patterns from each Hall element is printed on the flexible printed-wiring board 60 on which the Hall elements are also mounted.

Also, maintenance and inspection work is made simple because the board-holding assembly by which the flexible printed-wiring board 60 is held can be removed in a simple manner. The work of replacing the flexible printed-wiring board 60 on which the Hall elements are mounted can also be performed in a simple manner in a state in which the board holding assembly 50 is removed.

Because the drawn-out portion 66 of the flexible printed-wiring board 60 can be readily folded back in an out-of-plane direction, the work of folding this portion back and connecting it to the IF wiring board 23 that is positioned to the outer side in the radial direction can be performed in a simple manner. A reinforcement layer 68 having a constant width is formed on the edge portion of the main board body portion 65 to which the base portion of the drawn-out portion 66 is connected. Therefore, disconnects and other defects can be prevented because the edge portion does not get damaged even when excessive force acts on the edge portion due to the folding back of the drawn-out portion 66.

The invention claimed is:

1. A magnetic absolute encoder comprising:
   a bipolar magnet in which a circular external peripheral surface thereof is a bipolar magnetized surface;
   a bipolar-side first magnetic detection element and a bipolar-side second magnetic detection element for obtaining detection signals that differ 90 degrees in phase in accompaniment with rotation of the bipolar magnet;
   a multipolar magnet in which a circular external peripheral surface thereof is a multipolar magnetized surface of four or more poles, the multipolar magnet being adjacently arranged in a coaxial state in relation to the bipolar magnet;
   a multipolar-side first magnetic detection element and a multipolar-side second magnetic detection element that are used for obtaining detection signals that differ 90 degrees in phase in accompaniment with rotation of the multipolar magnet;
   a flexible printed-wiring board on which the bipolar-side first magnetic detection element, the bipolar-side second magnetic detection element, the multipolar-side first magnetic detection element, and the multipolar-side second magnetic detection element are mounted; and
   an annular board-holding part arranged in a coaxial state in relation to the bipolar magnet, wherein
   the board-holding part holds the flexible printed-wiring board in a loop shape so as to surround the bipolar magnet and the multipolar magnet, and
   the bipolar-side first magnetic detection element and the bipolar-side second magnetic detection element face the bipolar magnetized surface of the bipolar magnet at a fixed interval, and the multipolar-side first magnetic detection element and the multipolar-side second magnetic detection element face the multipolar magnetized surface of the multipolar magnet at a fixed interval, and wherein
   the board-holding part is provided with an annular base plate, and first and second board-mounting bases that are arranged at predetermined angular intervals so as to be positioned on a same circle on an annular end surface of the base plate,
   the first and second board-mounting bases are provided with first and second board-mounting surfaces, respectively, that face a center of the same circle and that are perpendicular to the annular end surface,
   the reverse-side portion of the flexible printed-wiring board is secured to each of the first and second board-mounting surfaces,
   the bipolar-side first magnetic detection element and the multipolar-side first magnetic detection element are mounted to a surface of a portion that is secured to the first board-mounting surface of the flexible printed-wiring board, and
   the bipolar-side second magnetic detection element and the multipolar-side second magnetic detection element are mounted to a surface of the portion secured to the second board-mounting surface of the flexible printed-wiring board.

2. The magnetic absolute encoder according to claim 1 wherein:
   the first and second board-mounting bases are attached to the annular end surface so as to allow movement for a predetermined distance in a circumferential direction of the annular end surface, and secured so as to disallow movement in the circumferential direction after the positioning in the circumferential direction has been adjusted; and
   the flexible printed-wiring board is spanned in a slack state between the first and second board-mounting surfaces of the first and second board-mounting bases.

3. The magnetic absolute encoder according to claim 1 further comprising:
   a bipolar-side third magnetic detection element used for obtaining a detection signal that is in phase or reverse phase with the bipolar-side first magnetic detection element, and a bipolar-side fourth magnetic detection element for obtaining a detection signal that is in phase or reverse phase with the bipolar-side second magnetic detection element in accompaniment with the rotation of the bipolar magnet; and a multipolar-side third magnetic detection element for obtaining a detection signal that is in phase or reverse phase with the multipolar-side first magnetic detection element, and a multipolar-side fourth magnetic detection element for obtaining a detection signal that is in phase or reverse phase with the multipolar-side second magnetic detection element in accompaniment with the rotation of the multipolar magnet, wherein the board-holding part is provided with a third board-mounting base and a fourth board-mounting base in addition to the first and second board-mounting bases and the first, second, third, and fourth board-mounting bases are attached to the annular end surface of the baseboard at 90 degree angular intervals so as to be positioned on the same circle;

the third and fourth board-mounting bases are provided with third and fourth board-mounting surfaces, respectively, that are perpendicular to the annular end surface facing the center of the same circle;

a portion of the reverse side of the flexible printed-wiring board is secured to each of the first, second, third, and fourth board-mounting surfaces;

the bipolar-side third magnetic detection element and the multipolar-side third magnetic detection element are mounted to a surface of the portion that is secured to the third board-mounting surface of the flexible printed-wiring board; and the bipolar-side fourth magnetic detection element and the multipolar-side fourth magnetic detection element are mounted to the surface of the portion that is secured to the fourth board-mounting surface of the flexible printed-wiring board.

4. The magnetic absolute encoder according to claim 3, wherein:

the first through fourth board-mounting bases are attached to the annular end surface so as to allow movement for a predetermined distance in the circumferential direction, and secured so as to disallow movement in the circumferential direction after the positioning in the circumferential direction has been adjusted; and the flexible printed-wiring board are spanned in a slack state between the first and second board-mounting surfaces, between the second and third board-mounting surfaces, and between the third and fourth board-mounting surfaces, respectively.

5. The magnetic absolute encoder according to claim 1, further comprising:

an arcuate interface wiring board extending to a predetermined angle range about the center of the baseboard is arranged to the outside of the annular end surface of the baseboard;

a board draw-out portion for connecting wires that is drawn out from the edge at a predetermined width is formed on one edge of the flexible printed-wiring board;

the board draw-out portion is folded back from the edge, extended to the outside in the radial direction of the baseboard, and connected to the interface wiring board;

the board draw-out portion is a portion with a low out-of-plane rigidity that can be readily folded back in comparison with other portions of the flexible printed-wiring board; and a reinforcement layer for preventing a reduction in durability due to the folding back is formed at a base portion of the board draw-out portion.

6. A motor comprising:

a motor rotary shaft;

a motor rotor attached to the motor rotary shaft;

a motor stator arranged in a state surrounding the motor rotor;

an electromagnetic brake for restraining the rotation of the motor rotary shaft, the electromagnetic brake being arranged in a location adjacent a rear side of the motor rotor of the motor rotary shaft; and a magnetic absolute encoder for detecting a rotational position of the motor rotary shaft, the magnetic absolute encoder being arranged in a location adjacent a rear side of the electromagnetic brake of the motor rotary shaft, wherein the magnetic absolute encoder is the magnetic absolute encoder according to claim 1.

7. A motor according to claim 6, wherein:

a cylindrical motor case is provided, which rotatably supports the motor rotary shaft via a front-side bearing and a rear-side bearing;

the rear-side bearing being arranged in a location between the electromagnetic brake of the motor rotary shaft and the magnetic absolute encoder; and the baseboard of the magnetic absolute encoder functioning as a bearing cap that is in contact from the rear of the center axis line of the motor in relation to the rear-side bearing.

* * * * *